May 2, 1961     H. J. SNYDER ET AL     2,982,679
PRESSING APPARATUS FOR GLASS LAMINATES
Filed Aug. 3, 1956     4 Sheets-Sheet 1

INVENTORS
HENRY J. SNYDER and
PAUL C. LAWSON
BY
Oscar L. Spencer
ATTORNEY

May 2, 1961 H. J. SNYDER ET AL 2,982,679
PRESSING APPARATUS FOR GLASS LAMINATES
Filed Aug. 3, 1956 4 Sheets-Sheet 2

INVENTORS
HENRY J. SNYDER and
PAUL C. LAWSON
BY
Oscar L. Spencer
ATTORNEY

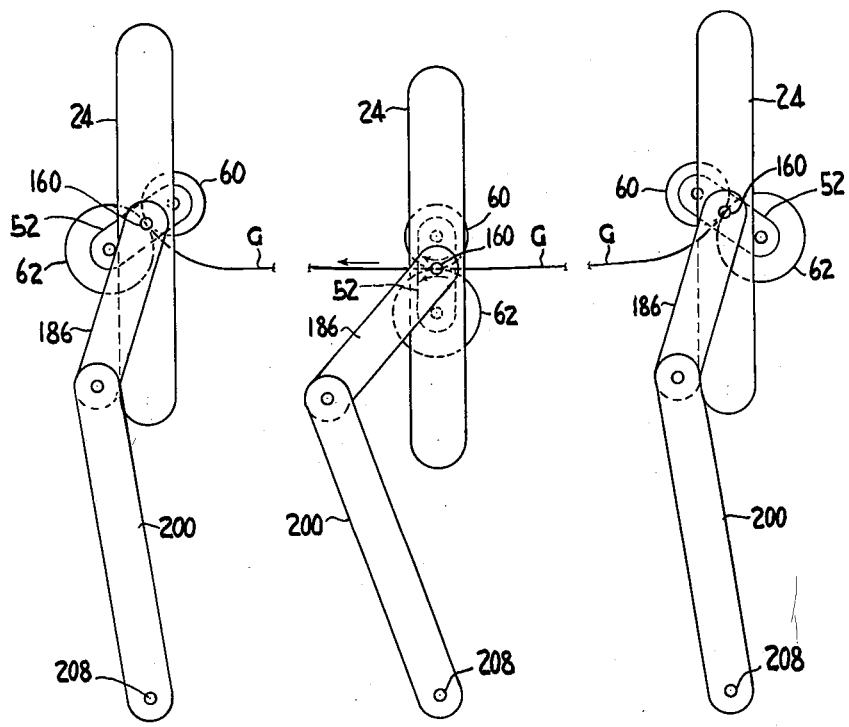

United States Patent Office 2,982,679
Patented May 2, 1961

2,982,679

PRESSING APPARATUS FOR GLASS LAMINATES

Henry J. Snyder and Paul C. Lawson, New Kensington, Pa., assignors to Pittsburgh Plate Glass Company, Allegheny County, Pa., a corporation of Pennsylvania Filed Aug. 3, 1956, Ser. No. 602,009

18 Claims. (Cl. 154—2.7)

This invention relates to laminated glass and in particular relates to apparatus for the pressing of bent glass laminated assemblies comprising two matched sheets of curved glass and a thermoplastic interlayer, especially for the preliminary pressing of the laminate prior to placing them in an autoclave for completion of the laminating process.

In the manufacture of laminated assemblies, it is desirable to obtain an overall adhesive bond between the glass sheets and a thermoplastic interlayer by subjecting the assembled sheets to heat and pressure while immersed in an oil in an autoclave. Unless the marginal edges of the laminated assemblies are sealed by bonding the glass to the thermoplastic interlayer or are otherwise protected, the oil in the autoclave may penetrate between the two sheets of glass and the interlayer with the result that part of the assembly being laminated will be discolored. In manufacturing flat laminated assemblies, the assembled sheets are subjected after being heated to a preliminary pressing by passing the assemblies between one or more pairs of nipper rolls, i.e., resilient or yieldable rolls. This preliminary pressing forces the air out from between the assembled sheets of glass and interlayer and provides a sufficient seal extending over the entire area of the sheets to prevent oil ingress and the resultant discoloration type of damage when the assembly to be laminated is directly immersed in the oil in an autoclave for the final pressing operation.

In the manufacture of bent or curved laminated assemblies, for example, curved windshields, the pair of nipper rolls should be mounted so that the pair can rotate about their line of contact to provide pressure on the opposite glass sheets with the pressure being approximately normal to the surfaces of the assembly being laminated. In the development of one-piece automobile windshields, the initial type of windshield had a cylindrical curvature. A later development was a type of windshield in which there were sharp bends near the ends of the windshield, i.e., the windshield had a reduction in the radius of curvature near the ends relative to the radius of curvature of the central section of the windshield. This latter type of windshield is known as the wrap-around windshield and even includes types of windshields in which the end sections are twisted about the longitudinal axis of the windshield so that the intermediate sections have conical surfaces rather than cylindrical surfaces. With these more complex types of curved assemblies to be pressed it was found necessary, when utilizing conveyors for feeding and receiving the assemblies to and from the pressing apparatus, to have the pair of nipper rolls mounted so that they are moved in a vertical direction as a unit as the laminate passes between the rolls. This vertical movement minimizes the amount of vertical displacement of the laminate as it passes through the pressing apparatus.

Apparatus have been developed in which the pair of nipper rolls are mounted so that they move as a unit in a vertical direction with movement of the rolls about their axis of contact as the laminates pass between the rolls. The mounting of the nipper rolls for vertical movement as a unit has included counterweighting so that the nipper rolls are free to move as a unit vertically to adjust to the height of the sections of the laminate passing therebetween, thus minimizing the force of the rolls acting on the assembly except for the opposed forces of the nipper rolls.

In the apparatus heretofore developed the members for rotatably mounting the nipper rolls and for providing rotation of the rolls as a unit about their axis of contact included a counterweight connected to one of said members as part of a roll housing assembly to cause the housing assembly to move from its tilted position at the end of the passage of a laminate through the nipper rolls to its tilted position for receiving another laminate to be pressed. Other apparatus utilized mechanical means intermittently actuated for oscillating the members supporting the nipper rolls to return the nipper rolls to the receiving position.

An object of the present invention is to provide a pressing apparatus with a roll housing assembly having a pair of nipper rolls and with a mechanism for driving the lower nipper roll so that the pair of rolls will automatically be moved about their axis of contact to the tilted position for receiving another laminate after a laminate has passed therebetween.

Another object of the invention is to provide a pressing apparatus that will provide the automatic return of the housing assembly with the nipper rolls to the tilted receiving position in which the automatic return means will not provide additional weight of components that must be counterweighted.

A further object of the present invention is to provide a pressing apparatus in which there is means for accelerating the automatic return of the nipper rolls as a unit to the tilted receiving position, in which the accelerating means cooperates with the automatic return means at the initial phase of the return operation and in which the accelerating means is permanently fixed to the roll housing assembly without affecting the balanced condition of the assembly.

Still another object of this invention is to provide a pressing apparatus in which a check means is used to limit the rate of movement and is adjustably mounted to limit the turning of the roll housing assembly by the automatic means to a predetermined tilted position for receiving the glass assembly to be laminated.

These and other objects of the invention will be apparent to those skilled in this art from the following description of a preferred embodiment of the pressing apparatus in conjunction with the drawings.

Briefly, the apparatus comprises a pair of nipper rolls rotatably mounted at their ends to a pair of spaced trunnion-containing supporting members with the pair of nipper rolls positioned to engage opposite surfaces of a bent laminate of two sheets of curved glass and the thermoplastic interlayer. The pair of supporting members are rotatably mounted by the trunnions to a supporting structure. The roll housing assembly, including the trunnion-containing supporting members and the pair of nipper rolls, is balanced and is mounted to a supporting structure by the trunnions so that the roll housing assembly is free to turn from the position at which it discharges a laminate to a position to receive a laminate. One of the nipper rolls is driven by a drive means also forming part of the roll housing assembly and this drive means is operated by a power-driven means. In the preferred embodiment the roll housing assembly is mounted to the supporting structure by slidably mounted spaced plates so that it can move vertically relative to the supporting structure. Of course, in a further modification the ends of the roll housing assembly can be mounted for separate movement of the ends in a vertical direction and can further be mounted so as to provide separate horizontal movement of the roll housing assembly relative to the supporting structure.

In the drawings in which like parts are designated by the same numerals:

Figure 6:
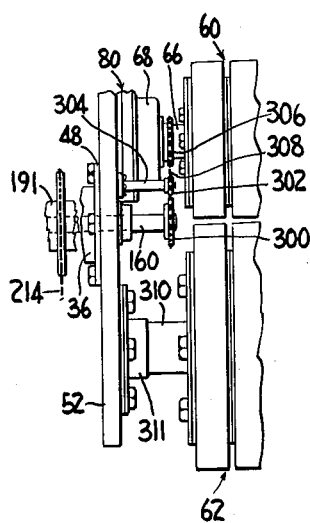
Figure 7:
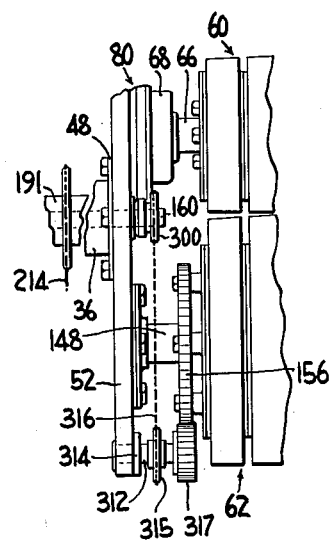
Figure 8:
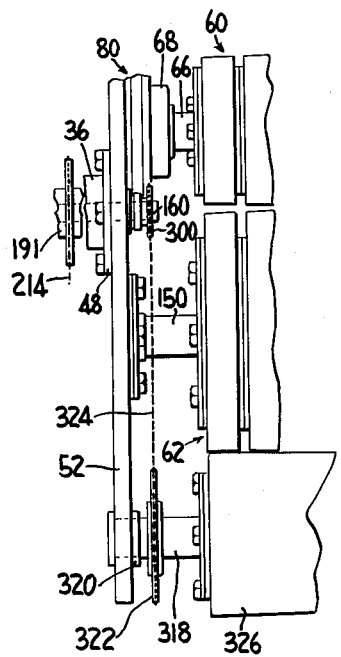

Figs. 6, 7 and 8 are fragmentary front elevations of alternative embodiments of the apparatus illustrating other structural arrangements for driving a nipper roll of the apparatus; and Figs. 9, 10 and 11 are fragmentary end elevations of the pressing apparatus showing the positions of the roll housing assembly including the pair of nipper rolls, of the vertically movable support plates for the housing assembly and of the arms of the jointed-arm drive assembly.

Figure 1:
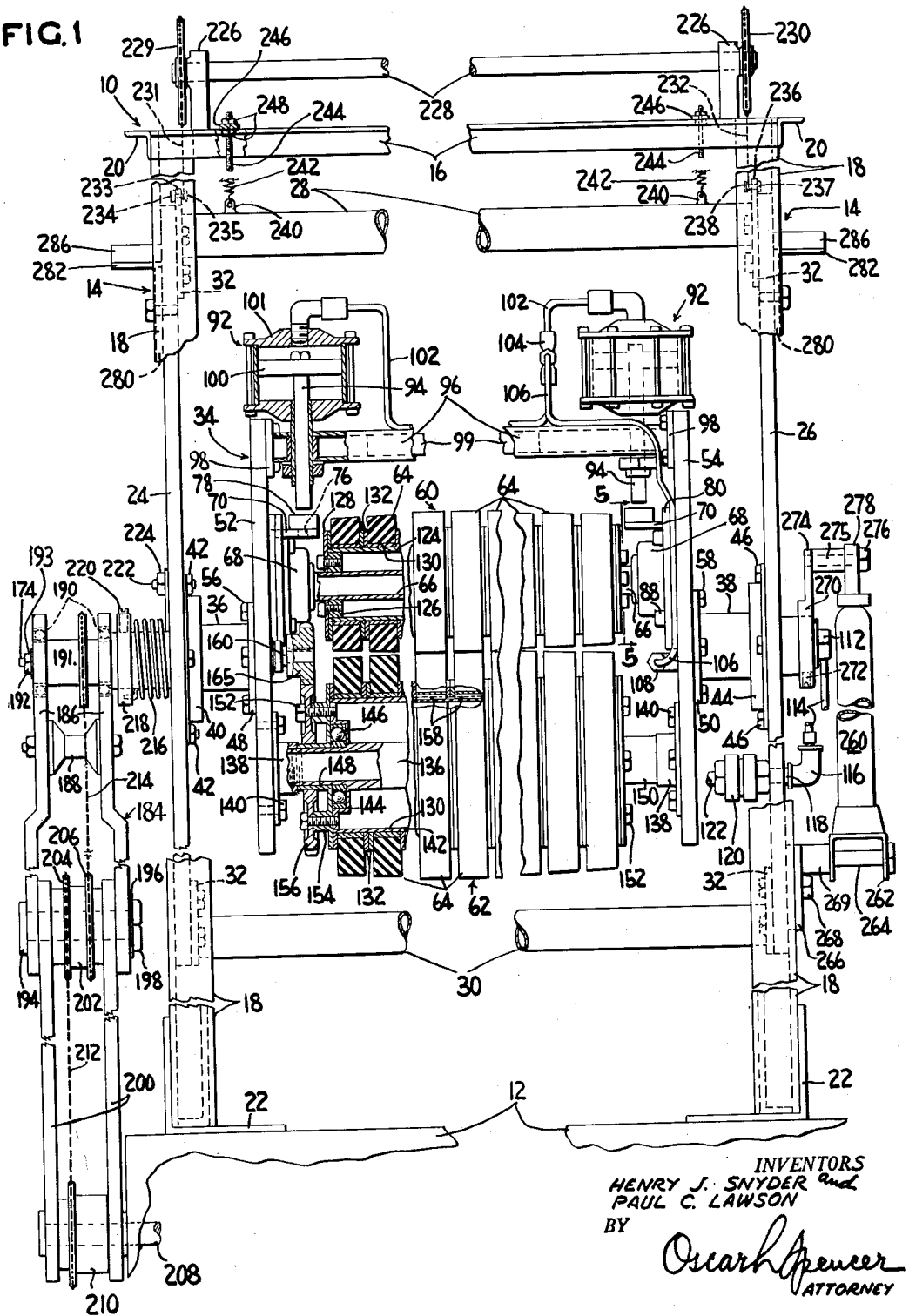
Fig. 1 is a front elevation, partially in section, and partially broken away, of the preferred embodiment of the pressing apparatus of the present invention.
Figure 4:
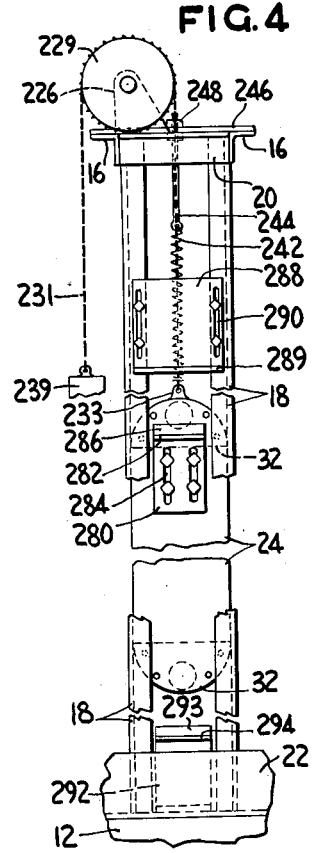
Fig. 4 is a reduced end elevation of the pressing apparatus with the jointed-arm, chain-and-sprocket drive assembly removed.

As seen in Fig. 1, the pressing apparatus of the preferred embodiment has a supporting structure generally indicated at 10 having a base 12 on which are mounted two vertical guide members 14. The top of the supporting structure has angle iron members 16 connected to guide members 14. Each of guide members 14 is formed of two angle iron members 18 (see Fig. 4) that are joined by angle iron members 20. The bottoms of guide members 14 are mounted to angle iron members 22 that are fastened to base 12.

Within guide members 14 of supporting structure 10 are slidably mounted plates 24 and 26. The plates 24 and 26 are mounted in guide members 14 for free vertical movement and are maintained in spaced apart relationship by means of spacer tubes 28 and 30 having flanged ends 32 by which tubes 28 and 30 are bolted to the ends of plates 24 and 26.

Figure 2:
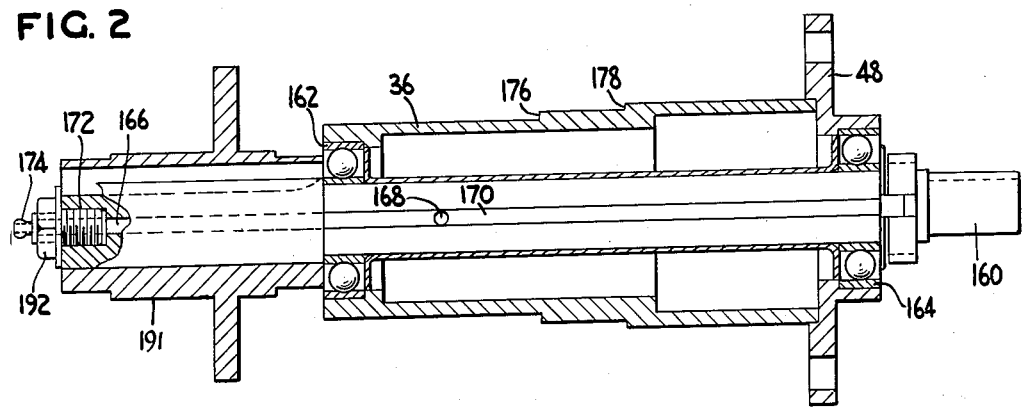
Fig. 2 is an enlarged cross section of one of the trunnions for rotatably mounting the roll housing assembly of the apparatus and having the driving shaft mounted therein with the driving sprocket mounted on the shaft.
Figure 3:
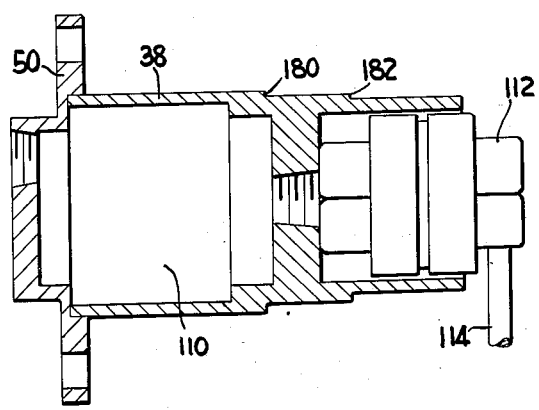
Fig. 3 is an enlarged cross section of the other trunnion.

A roll housing assembly generally indicated at 34 is rotatably mounted between plates 24 and 26 by means of trunnions 36 and 38. Trunnion 36 is rotatably mounted to plate 25 by means of flanged bearing 40 mounted by bolts 42. Trunnion 36 extends through plate 24. Similarly trunnion 38 extends through plate 26 and is rotatably mounted by bearing 44 fastened to plate 26 by bolts 46. As seen in Figs. 2 and 3, trunnions 36 and 38 near one end have flanges 48 and 50, respectively. The roll housing assembly 34 has a pair of spaced plates 52 and 54 and flanges 48 and 50 are mounted to plates 52 and 54, respectively, by bolts 56 and 58, respectively.

The roll housing assembly 34 has a pair of nipper rolls generally indicated at 60 and 62. The nipper roll 60 has a number of resilient rings 64, such as rubber rings. The nipper rolls 60 has a tubular shaft 66. The shaft 66 is rotatably supported at its ends by means of flanged bearings 68 that are mounted to plates 70 by bolts 72. Plates 70 have flanges 74 with apertures 76 in which are mounted members 78. Plates 70 are slidably mounted in guides generally indicated at 80, being formed of a pair of bars 82 spaced from plates 52 and 54 for each guide 80 by means of narrower bars 84 to provide channels for receiving plates 70.

Figure 5:
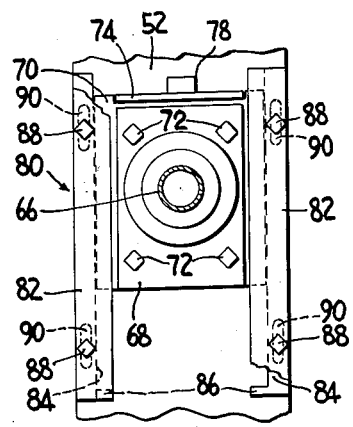
Fig. 5 is a fragmentary view taken along line 5—5 of Fig. 1.

As seen in Fig. 5, bars 84 for each guide 80 have bottom legs 86 that extend toward one another. Each leg 86 serves as a bottom stop of the channels of guides 80. Bolts 88 extend through holes in bars 82 and slots 90 in bars 84. Slots 90 in bars 84 provide for adjustable positioning of legs 86 for adjustable stop positioning of plates 70 that rotatably support roll 60 by bearings 68.

The mounting of roll 60 by means of plates 70 slidably positioned in guides 80 provides for movement of roll 60 away from roll 62 as a laminate passes therebetween but roll 60 at the same time is resiliently urged toward roll 62 by means of pneumatic cylinder assemblies generally indicated at 92. The assemblies 92 have piston rods 94 contacting members 78 upon movement of roll 60 away from roll 62. The rods 94 resiliently limit said movement of roll 60 away from roll 62. The pneumatic cylinder assemblies 92 are mounted on a counterweight tubular member 96 that has flanged ends 98 bolted to plates 52 and 54. The counterweight member 96 contains lead weights 99 to balance roll housing assembly 34 in all positions of its rotation about the axes of trunnions 36 and 38. This counterweighting is especially necessary in the preferred embodiment because rolls 62 is larger and therefore heavier than roll 60.

Each of the pneumatic cylinder assemblies 92 has a piston 100 mounted on rod 94 and within housing 101. Air pressure is provided in housing 101 by means of conduits 102 connected by means of T-shaped coupling 104 to conduit 106 that is connected by coupling 108 to passageway 110 of trunnion 38. The other end of passageway 110 communicates with a coupling 112 connected by means of flexible conduit 114, coupling 116, pipe 118 mounted on and extending through plate 26, coupling 120, and flexible conduit 122 connected to an air source (not shown) for providing a controlled amount of air pressure within housing 101 for vertical positioning of rods 94 to contact member 78 for resiliently restraining further movement of roll 60 away from roll 62.

The roll 60 has a tubular sleeve 124 coaxial with tubular shaft 66. The sleeve 124 is spaced from shaft 66 at the ends of the former by means of end members 126 connected to shaft 66 and sleeve 124. Circular plates 128 are bolted to end members 126. The circular plates 128 have a larger diameter than sleeve 124. The rings 64 are mounted on sleeve 124 with bushings 130 between rings 64 and sleeve 124. Rings 64 are separated from one another by a pair of spacer rings 132. The rings 64 at the ends are spaced from end plates 128 by means of rings 132. By this arrangement, rings 64 will rotate upon rotation of shaft 66 but are free to rotate at faster or slower speeds than other rings 64 as a laminate passes between rolls 60 and 62, especially when the laminate is moved transversely at one end to position the laminate for the best passage of the trailing conical section thereof for its passage between rolls 60 and 62.

The bottom roll 62 has a tubular shaft 136 that is threaded at each end. The threaded ends of shaft 136 have mounted thereon flange supporting members 138 that are mounted by bolts 140 to plates 52 and 54. A tubular sleeve 142 of roll 62 has end members 144. Each of the end members 144 has a recessed central section with an aperture for receiving shaft 136. Bearings 146 are mounted in the recesses of the end members 144 to provide rotation of sleeve 142 relative to fixed shaft 136. Flanged sleeves 148 and 150 are rotatably mounted on shaft 136. Flanged sleeves 148 and 150 are fastened at their flanges to end members 144 by means of bolts 152. The flanged sleeve 148 has apertured bosses 154 through which bolts 152 pass for threaded engagement with end members 144. A spur gear 156 is mounted on flanged sleeve 148 and fastened by bolts 152. The gear 156 is spaced from the flange of sleeve 148 by bosses 154. The spur gear 156 is used to drive roll 62. The roll 62 has a number of resilient rings 64 like roll 60 and these segmental nipper roll segments 64 are spaced apart by spacer rings 132 and are mounted on tubular shaft 136 by means of ring bushings 130. The central rubber or resilient rings 64 are mounted on bushings 130 that are fixed on tubular sleeve 142 by keys 158 so that the central resilient nipper roll segments 64 are driven by the rotation of sleeve 142 by gear 156.

A drive shaft 160 is rotatably mounted in trunnion 36 by means of bearings 162 and 164 as seen in Fig. 2. One end of shaft 160 has a spur gear 165 keyed thereon and the other end of shaft 160 has a central passage 166 communicating at its inner end with a radial passage 168. The shaft 160 has a longitudinal flattened surface segment 170 extending toward each end from passage 168. The end of shaft 160 having the central passage 166 has a threaded countersink 172 in which is threaded a grease fitting 174 to provide grease by means of passages 166 and 168 and flattened surface 170 to bearings 162 and 164.

The outer surface of trunnion 36 is stepped to provide two intermediate shoulders 176 and 178. The trunnion 36 is rotatably mounted in and through plate 24 by means of a countersunk aperture in which bearing 40 is mounted. Similarly, trunnion 38 has a stepped longitudinal surface to provide a pair of shoulders 180 and 182 for mounting bearing 44 in a countersunk aperture in plate 26.

A jointed arm drive assembly generally indicated at 184 has a pair of arms 186 that are maintained in spaced-apart relationship by spacer element 188. The arms 186 are rotatably mounted on drive shaft 160 by means of bearings 190. A sprocket 191 is keyed on shaft 160 between arms 186 and is prevented from sliding off shaft 160 by a nut 192 and a key-engaging washer 193. The other ends of arms 186 are pivotally mounted by bearings (not shown) on shaft 194 having an enlarged head at one end and threaded at the other end to receive a washer 196 and a nut 198. A pair of arms 200 spaced apart by a spacer element (not shown) intermediate the ends is mounted at one end on shaft 192 between arms 186. Also mounted on shaft 194 by bearings (not shown) is a double sprocket member 202 having sprockets 204 and 206. The arms 200 are rotatably mounted on shaft 194 by means of bearings (not shown). The other ends of arms 200 are rotatably mounted on a shaft 208 by means of bearings (not shown) and keyed on shaft 208 between arms 200 is a sprocket 210. The shaft 208 is supported by base 12 by means of a bearing (not shown) and is driven by a motor (not shown). A chain 212 engages sprockets 210 and 204. A chain 214 engages sprocket 191 and sprocket 206. The shaft 208 drives shaft 160 by means of chains 212 and 214 and sprockets 191, 204, 206 and 210 of jointed arm drive assembly. The arms 186 and 200 pivot about shaft 194, arms 186 pivot about shaft 160 and arms 200 pivot about shaft 208 upon vertical movement, up or down, of plates 24 and 26 during passage of a laminate between rolls 60 and 62 and upon upward vertical movement of plates 24 and 26 after passage of a laminate through rolls 60 and 62 in order to return the roll housing assembly 34 to the proper height for receiving the next laminate.

A spring 216 is mounted on trunnion 36 with one end of the spring fastened to ring member 218 fixed on trunnion 36 by set screw 220. The other end of spring 216 is fastened by bolt 222 and nut 224 to plate 24. The ring member 218 is secured to trunnion 36 by set screw 220 so that spring 216 is in the untwisted condition when the roll housing assembly 34 is in the tilted position to receive a laminate to be pressed by the apparatus, i.e., with the rolls positioned to receive the leading edge of the laminate between rolls 60 and 62. The spring 216 has insufficient action when twisted to return the balanced roll housing 34 to said tilted receiving position, but when sufficiently twisted by the rotation of housing 34 to the tilted position for discharging the laminate the torque created by the spring will provide an immediate torque to rapidly start the assembly 34 rotating about trunnions 36 and 38 from the tilted discharge position towards the tilted receiving position. The torque created by the rotation of spur gear 156 by means of spur gear 165 will return the roll housing 34 to the tilted receiving position but the initial phase of the return is accelerated by means of spring 216.

A pair of pillow blocks 226 is mounted on angle iron members 16 of supporting structure 10. A shaft 228 is rotatably supported by pillow blocks 226. Sprockets 229 and 230 are keyed on the ends of shaft 228. Chains 231 and 232 engage sprockets 229 and 230, respectively. One end of chain 231 is fastened to lug 233 of one flanged end 32 of tube 28 by bolt 234 and nut 235 and one end of chain 232 is fastened to lug 236 of the other flanged end 32 of tube 28 by bolt 237 and nut 238. The chains 231 and 232 have connected at the other end weights 239 that counterweight plates 24 and 26 and the parts of the apparatus supported thereby so that the housing assembly 34 will be in the proper vertical position for the tilted assembly 34 to engage the curved laminate at its leading edge substantially between the pair of nipper rolls 60 and 62. By keying sprockets 229 and 230 to shaft 228 in this preferred embodiment plates 24 and 26 move in unison.

The spacer tube 28 has lugs 240. Springs 242 are connected at one end of each lugs 240 and the other end of each spring 242 is connected to threaded rods 244 at the bottom end of each. The rods 244 are vertically mounted by plates 246 mounted on angle iron members 16. The vertical positioning of rods 244 on plates 246 is obtained by nuts 248 thereby controlling the amount of tension on springs 242 that is obtained during lowering of plates 24 and 26.

A door check 260 with a clevis base 262 is pivotally mounted on shaft 264. A plate 266 is mounted on plate 26 by bolt 268 that during operation prevents plate 266 from rotating. Loosening of bolt 268 will permit rotation of plate 266. Clevis base 262 is spaced from plate 266 by spacer member 269. The shaft 264 is threaded into plate 266 and rotation of plate 266 about the axis of bolt 268 provides adjustable vertical positioning of door check 260. A collar 270 is rigidly mounted on trunnion 38 by means of a set screw 272. A portion of collar 270 has a lateral extension or flange 274 having a threaded aperture. A threaded cylinder 275 coaxial with said threaded aperture has threaded therein a bolt 276 having an unthreaded section adjacent the head for pivotally engaging a coupling 278 by means of a bushing (not shown). The coupling 278 is threaded on the end of door check 260. Adjustment of plate 266 on plate 26 by means of bolt 268 and/or adjustment of collar 270 on trunnion 38 by loosening set screw 272 provides a wide range of adjustment of door check 260 to prevent tilting of roll housing assembly 34 beyond the desired point for receiving a laminate to be pressed. The door check 260 by its dashpot (not shown) lowers the rate of turning of the roll housing assembly 34 by trunnions 36 and 38 about plates 24 and 26 as the assembly 34 approaches the tilted position to receive a laminate.

Plates 24 and 26 each have a plate 280 having a flange 282 mounted near the top. Vertical adjustment of the mounting of plate 280 is provided by slots 284 in plate 280. A resilient pad member 286 is mounted on each flange 282. A stop plate 288 having a flange 289 is adjustably mounted to members 18 of guide members 14. The plate 288 is mounted near the top of guide member 14 and adjustability is provided by slots 290 in plate 288. Upward movement of plates 24 and 26 is limited by pads 286 abutting flanges 289. A pair of stop channel members 292 is mounted on base 12 and a resilient member 293 mounted on flange 294 of each channel member 292 limits the downward movement of roll housing assembly 34 in case of breaking of chains 231 or other support failure by plates 24 and 26 contacting members 293. Of course, the counterweights 239 simply determine the degree or extent of upward movement of plates 24 and 26, which are mounted for free vertical movement in guide members 14, but the final adjustment of maximum height for receiving position of assembly 34 is provided by stop plate 288. Springs 242 start the upward movement after a laminate has passed between rolls 60 and 62 and engagement of pad members 286 by flanges 289 prevents counterweights 239 from pulling upwardly the plates 24 and 26 beyond the finally desired point. The flanged stop channel members 292 with their resilient members 293 on flanges 294 serve as safety stop members because they are positioned so that plates 24 and 26 do not engage members 293 when the plates have moved downwardly to the lowest position called for by the passage of a laminate between rolls 60 and 62.

Figs. 6, 7 and 8 show alternative mechanisms for driving the nipper rolls and utilize rotary driving means such that the torque developed will cause the nipper rolls 60 and 62 and the roll housing assembly 34 to rotate about its pivotal axis upon discharge of a glass laminate being pressed to the tilting position for receiving another laminate. Referring to Fig. 6, in which parts that are identical to those in the embodiment of Figs. 1–5 are designated by the same numerals, the shaft 160 has keyed on its end a sprocket 300 instead of spur gear 165. An idler sprocket 302 is rotatably mounted on stub shaft 304 mounted on plate 52. A sprocket 306 is keyed on shaft 66. A chain 308 engages sprockets 300, 302 and 306. In the apparatus of Fig. 6 it is noted that spur gear 156 of Fig. 1 is not used and thus a shaft 310, like shaft 66 of Fig. 1, is utilized at both ends of roll 62 that is constructed like roll 60 of Fig. 1. Shaft 310 is rotatably mounted to plates 52 and 54 by flanged bearings 311. In this embodiment, top roll 60 is driven and thus its central rings are keyed as is done for those of the lower roll 62 in the embodiment of Fig. 1.

In Fig. 7 sprocket 300 is mounted, as in Fig. 6, on shaft 160. A stub shaft 312 is rotatably mounted on plate 52 by means of bearing 314. On shaft 312 is keyed a sprocket 315 engaged by chain 316 that engages sprocket 300. Also keyed on shaft 312 is a spur gear 317 engaging spur gear 156 mounted on roll 62 as in Fig. 1.

In Fig. 8 sprocket 300 is likewise used to drive a drive means for roll 62. A shaft 318 is rotatably mounted to plates 52 and 54 by bearings 320 and a sprocket 322 is keyed on shaft 318. A chain 324 engages sprockets 300 and 322. A drive roll 326 is rigidly mounted on shaft 318 and engages roll 62 so that by frictional engagement of rotating roll 326 with roll 62 there is produced a rotation of roll 62.

In the apparatus of the present invention torque is created by the proper combination of the power-driving means and the drive means engaged thereby in which the torque is provided in the proper direction to automatically rotate the roll housing 34 about trunnions 36 and 38. Although the torque of spring 216 cooperates with the torque at the initial phase of the return from the discharging tilted position to the return tilted position to receive another laminate, this spring torque is effective only at the initial phase. The roll housing assembly 34 is completely balanced so that the torque is sufficient and will act to return the roll housing assembly from the discharge tilted position to the receiving tilted position. The check means 260 not only serves to provide adjustable stop means to prevent the torque from moving the roll housing assembly 34 beyond the predetermined tilted position but also serves to slow down the rate of movement of the housing assembly 34 as it approaches the desired final tilted receiving position. Thus the assembly 34 will rapidly come to the desired tilted receiving position without oscillation in the tilted position. This arrangement permits the roll housing to be returned automatically to the tilted receiving position and rapidly be positioned so that another laminate being passed or fed to the roll housing assembly can approach rolls 60 and 62 without said rolls oscillating about trunnions 36 and 38. The advantages of this arrangement are obvious.

Referring to Figs. 9, 10 and 11, a laminate designated G is moved from right to left as indicated by the arrow in Fig. 10. The pair of nipper rolls 60 and 62 are driven in the directions as indicated by the arrows in Fig. 10. The leading edge of the laminate G moves into engagement with and between nipper rolls 60 and 62 as indicated in Fig. 9. The pressing apparatus at this time is disposed as indicated in Fig. 9. The plates 52 and 54 which are rotatable about the axis of shaft 160 have been automatically returned to this tilted position as described above. The plates 24 and 26 have been raised to the position indicated by counterweights 239 as described above. The raising of plates 24 and 26 moves arms 186 and 200 to the positions indicated in Fig. 9.

As the laminate G passes between the rolls 60 and 62, the pair of rolls will move from the inclined position shown in Fig. 9 until roll 60 is disposed directly above roll 62 and the central portion of the curved laminate G is passing between rolls 60 and 62 as shown in Fig. 10. Also as the curved laminate G passes between the rolls 60 and 62, the plates 24 and 26 will move downwardly until they reach the position indicated in Fig. 10, and at the same time the relative positions of arms 186 and 200 of the jointed-arm drive assembly 184 will change to the positions indicated in Fig. 10.

As the upwardly curved trailing portion of the laminate G passes between rolls 60 and 62, the rolls 60 and 62 and their plates 52 and 54 will be tilted in the opposite direction from that shown in Fig. 9. The final tilted position is shown in Fig. 11. At the same time plates 24 and 26 will be moved upwardly, thereby changing the positions of arms 186 and 200. When the trailing edge of the laminate G is leaving the pressing apparatus, rolls 60 and 62, plates 50 and 54, vertically movable plates 24 and 26, and arms 186 and 200 will be disposed as shown in Fig. 11. Of course, the positions shown in Figs. 9, 10 and 11 for these parts of the pressing apparatus are merely illustrative. These positions will be dependent upon the pattern of curvature of the laminate G that is being pressed by the apparatus.

In the above description of the preferred embodiment and several modifications thereof, the roll that is driven has the central rings keyed. The central rings 64 of top and bottom rolls 60 and 62 have a slightly higher hardness value than the other rings of said rolls. In a variation the central rings of the other roll can likewise be keyed. It is preferred that the top roll be smaller than the bottom roll. In the preferred embodiment the rings increase in size from the ends toward the center of each roll so that the rolls are essentially crowned rolls. The rolls can be of any other form of construction such as inflated nipper rolls. Of course, all of the rings 64 of rolls 60 and 62 can have their bushings 130 keyed to shaft 136. The rolls can be cylindrical or conical and the axes of rotation of the rolls can be nonparallel.

The apparatus can be constructed without the vertical movement that is provided by plates 24 and 26 or plates 24 and 26 can be mounted to move horizontally as well as vertically.

Laminates are fed to assembly 34 by a conveyor and are removed from the pressing apparatus by another conveyor on the other side. The feed conveyor can have a device for properly aligning the curved laminate so that its leading end will be arranged for the proper entrance angle where the curved laminate has its end sections twisted about the longitudinal axis. The laminates are fed by the conveyor with the concave side on top and with the axis of curvature of the laminate being transverse to the direction of movement of the laminate by the conveyor. The discharge conveyor can be provided with a suitable device for positioning the leading portion of the laminate that has passed through the pair of nipper rolls in a direction transverse to the movement along the conveyor so that the trailing end section, that is twisted about the longitudinal axis of the laminate, will pass between rolls 60 and 62 in the optimum direction.

The foregoing has described the preferred embodiment of the pressing apparatus of the present invention, but many modifications are apparent to one skilled in the art. The invention is not intended to be limited to the preferred embodiment and the modifications described above but is limited only by the following claims.

We claim:

1. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions rotatably mounted to said supporting structure providing an axis of rotation for said assembly between a position to receive a laminate and a position to discharge the laminate, a pair of nipper rolls rotatably mounted to the supporting members for engagement of the rolls against opposite surfaces of the laminate and drive means operatively connected to one of said nipper rolls for rotation of said roll about its axis of rotation, and a rotatable power-driven means including a shaft rotatably mounted coaxial with one of said trunnions and between said spaced supporting members, means for rotating said shaft, and means connected to said shaft and operatively connected to said drive means of said assembly and providing therewith a torque causing rotation of said assembly into the position to receive the laminate.

2. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supoprting members, said trunnions providing an axis of rotation for said assembly relative to the supporting structure between a position to receive a laminate and a position to discharge the laminate, a pair of nipper rolls rotatably mounted to the supporting members for engagement of the rolls against opposite surfaces of the laminate and drive means operatively connected to one of said nipper rolls, a shaft rotatably supported by and extending through one of said trunnions and between said spaced supporting members, means for operating said drive means mounted on said shaft, and means for rotating said shaft, said means for operating said drive means providing with said drive means a torque causing rotation of said assembly into position to receive the laminate.

3. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate and a first spur gear mounted to one of said nipper rolls, a shaft rotatably mounted within and extending beyond one of said trunnions and between said spaced supporting members, a second spur gear mounted on said shaft and engaging the first spur gear, and means for rotation of said shaft, said spur gears providing a torque causing rotation of said assembly into the position to receive the laminate.

4. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate and a first sprocket mounted to the top nipper roll, a shaft rotatably mounted within and extending beyond one of said trunnions and between said spaced supporting members, a second sprocket mounted on said shaft, a chain engaging said sprockets, and means for rotation of the said shaft, said sprockets and chain providing a torque causing rotation of said assembly into the position to receive the laminate.

5. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate and a first spur gear mounted to the bottom nipper roll, a first shaft rotatably mounted within and extending beyond one of said trunnions and between said spaced supporting members, a first sprocket mounted on said shaft, a second shaft rotatably mounted on one of said supporting members, a second sprocket and a second spur gear mounted on said second shaft, said second spur gear engaging said first spur gear, a chain engaging said sprockets, and means for a rotation of said first shaft, said spur gears, sprockets and chain providing a torque causing rotation of said assembly into the position to receive the laminate.

6. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate, a driving roll rotatably mounted to the supporting members for frictional driving engagement with the bottom nipper roll and a first sprocket mounted to said driving roll, a shaft rotatably mounted within and extending beyond one of said trunnions and between said spaced supporting members, a second sprocket mounted on said shaft, a chain engaging said sprockets, and means for rotation of said shaft, said sprockets and chain providing a torque causing rotation of said assembly into the position to receive the laminate.

7. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions being rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate and drive means operatively connected to one of said nipper rolls for rotation of said roll about its axis of rotation, a rotatable power-driven means including a shaft rotatably mounted coaxial with one of said trunnions and between said spaced supporting members, means for rotating said shaft, and means connected to said shaft and operatively connected to said drive means of said assembly and providing therewith a torque causing rotation of said assembly into the position to receive the laminate, and an adjustable stop means for limiting the turning of the assembly in the tilted laminate-receiving position, said stop means including a crank arm rigidly mounted on one of said trunnions and check means pivotally mounted at one end to said supporting structure and at the other end to said crank arm, said check means decelerating the rotation of the assembly as it approaches the position to receive the laminate.

8. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions being rotatably mounted to said supporting structure to provide an axis of rotation for said assembly between a position to receive a laminate and a position to discharge the laminate, a pair of nipper rolls rotatably mounted to the supporting members for engagement of the rolls against opposite surfaces of the laminate and drive means operatively connected to one of said nipper rolls for rotation of said roll about its axis of rotation, a rotatable power-driven means including a shaft rotatably mounted coaxial with one of said trunnions and between said spaced supporting members, means for rotating said shaft, and means connected to said shaft and operatively connected to said drive means of said assembly and providing therewith a torque causing rotation of said assembly into the position to receive the laminate, a plate mounted on one of said supporting members for adjustment about a pivotal axis, and a stop means for limiting the turning of the assembly in the tilted laminate-receiving position, said stop means including a crank arm adjustably rigidly mounted on one of said trunnions and check means pivotally mounted at one end to said plate eccentric to the pivotal axis of adjustment of said plate and at the other end to said crank arm, said check means decelerating the rotation of the assembly as it approaches the position to receive the laminate.

9. Apparatus for pressing a bent laminate comprising two matched curved glass sheets and a thermoplastic interlayer, said apparatus comprising a supporting structure, a freely turning balanced roll housing assembly including a pair of spaced supporting members, a trunnion for each of said supporting members, said trunnions being rotatably mounted to said supporting structure to provide an axis of rotation for said assembly between a position to receive a laminate and a position to discharge the laminate, a pair of nipper rolls rotatably mounted to the supporting members for engagement of the rolls on opposite surfaces of the laminate and drive means for one of said nipper rolls, a rotatable power-driven member operating said drive means of said assembly and providing therewith a torque causing rotation of said assembly into the position to receive the laminate, and a spring mounted on one of said trunnions and having one end connected to said trunnion and the other end connected to said supporting structure, said spring being connected to provide a torque on the assembly in the position to discharge the laminate that cooperates with the torque provided by the drive means and the power-driven member but the spring torque alone is insufficient to return the assembly to the position to receive the laminate.

10. The apparatus of claim 9 and further including a ring mounted on the trunnion having the spring mounted thereon and a set screw fastening the ring on the trunnion, said spring having one end connected to said ring and the other end connected to said supporting structure.

11. Apparatus for pressing a bent laminate comprising two matched curved glass sheets and a thermoplastic interlayer, said apparatus comprising a supporting structure, a first pair of spaced supporting members mounted for free vertical movement relative to the supporting structure, a freely turning balanced roll housing assembly including a second pair of spaced supporting members, a trunnion for each of said second pair of supporting members, said trunnions rotatably mounted to the first pair of supporting members providing an axis of rotation for said assembly between a position to receive a laminate and a position to discharge the laminate, a pair of nipper rolls rotatably mounted to the second pair of supporting members for engagement of the rolls against opposite surfaces of the laminate and drive means operatively connected to one of said nipper rolls for rotation of said roll about its axis of rotation, and a rotatable power-driven means including a shaft rotatably mounted coaxial with one of said trunnions and between said spaced supporting members, means for rotating said shaft, and means connected to said shaft and operatively connected to said drive means of said assembly and providing therewith a torque causing rotation of said assembly into the position to receive the laminate.

12. Apparatus for pressing a bent laminate comprising two matched curved glass sheets and a thermoplastic interlayer, said apparatus comprising a supporting structure, a first pair of spaced supporting members mounted for free vertical movement relative to the supporting structure, a freely turning balanced roll housing assembly including a second pair of spaced supporting members, a trunnion for each of said second pair of supporting members, said trunnions rotatably mounted to the first pair of supporting members providing an axis of rotation for said assembly between a position to receive a laminate and a position to discharge the laminate, a pair of nipper rolls rotatably mounted to the second pair of supporting members for engagement of the rolls against opposite surfaces of the laminate and drive means operatively connected to one of said nipper rolls, a shaft rotatably supported by and extending through one of said trunnions and between said second pair of spaced supporting members, means for operating said drive means mounted on said shaft, and means for rotating said shaft, said means for operating said drive means providing with said drive means a torque causing rotation of said assembly into position to receive the laminate.

13. Apparatus for pressing a bent laminate comprising two matched curved glass sheets and a thermoplastic interlayer, said apparatus comprising a supporting structure, a first pair of spaced supporting members mounted for free vertical movement relative to the supporting structure, a freely turning balanced roll housing assembly including a second pair of spaced supporting members, a trunnion for each of said second pair of supporting members, said trunnions rotatably mounted to the first pair of supporting members providing an axis of rotation for said assembly between a position to receive a laminate and a position to discharge the laminate, a pair of nipper rolls rotatably mounted to the second pair of supporting members for engagement of the rolls against opposite surfaces of the laminate and a first spur gear mounted to the bottom nipper roll, a shaft rotatably mounted within and extending beyond one of said trunnions and between said second pair of spaced supporting members, a second spur gear mounted on said shaft and engaging the first spur gear, and means for rotation of said shaft, said spur gears providing a torque causing rotation of said assembly into the position to receive the laminate.

14. The apparatus of claim 13 wherein the means for rotation of said shaft comprises a jointed-arm drive assembly including a first arm, a second arm, said first arm being pivotally mounted at one end on said shaft and said second arm being pivotally mounted on the other end of said first arm and said second arm being pivotally mounted at the other end to the supporting structure, a first sprocket mounted on said shaft for rotation thereof, second and third sprockets rotatably mounted to one of said arms on the axis of pivotal connection of said arms for rotation of said second sprocket with rotation of said third sprocket, a fourth sprocket rotatably mounted to said second arm on the axis of pivotal mounting of said arm to said supporting structure, a first chain engaging the first and second sprockets and a second chain engaging the third and fourth sprockets, and means for rotation of the fourth sprocket.

15. Apparatus for pressing a bent laminate comprising two matched curved glass sheets and a thermoplastic interlayer, said apparatus comprising a supporting structure including a pair of vertical guide members and a horizontal cross member connecting the guide members at the top, a first pair of spaced supporting members mounted for free vertical movement within said guide members, top and bottom spacer members connected to the top and bottom of said first pair of supporting members, counterweight means mounted on said supporting structure and connected to said first pair of supporting members, spring means connected to said top spacer member and mounted on said cross member, a freely turning balanced roll housing assembly including a second pair of spaced supporting members, a trunnion for each of said second pair of supporting members, said trunnions rotatably mounted to the first pair of supporting members providing an axis of rotation for said assembly between a position to receive a laminate and a position to discharge the laminate, a pair of nipper rolls rotatably mounted to the second pair of supporting members for engagement of the rolls against opposite surfaces of the laminate and drive means operatively connected to one of said nipper rolls for rotation of said roll about its axis of rotation, and a rotatable power-driven means including a shaft rotatably mounted coaxial with one of said trunnions and between said spaced supporting members, means for rotating said shaft, and means connected to said shaft and operatively connected to said drive means of said assembly and providing therewith a torque causing rotation of said assembly into the position to receive the laminate.

16. Apparatus for pressing a bent laminate comprising two matched curved glass sheets and a thermoplastic interlayer, said apparatus comprising a supporting structure, a first pair of spaced supporting members mounted for free vertical movement relative to the supporting structure a freely turning balanced roll housing assembly including a second pair of spaced supporting members, a trunnion for each of said second pair of supporting members, said trunnions rotatably mounted to the first pair of supporting members providing an axis of rotation for said assembly between a position to receive a laminate and a position to discharge the laminate, a pair of nipper rolls rotatably mounted to the second pair of supporting members for engagement of the rolls against opposite surfaces of the laminate and a first spur gear coaxially mounted to the lower nipper roll, a second spur gear coaxial with one of said trunnions and engaging said first spur gear, and means for driving said second spur gear, said spur gears providing a torque causing rotation of said assembly into position to receive the laminate.

17. The apparatus of claim 16 and further including a spring and a ring mounted on one of said trunnions, one end of said spring being connected to said ring and the other end of said spring being connected to the first pair of supporting members, and means for adjustably fixing said ring to said trunnion, said spring being connected to said trunnion by said ring to provide a torque on the assembly in the position to discharge the laminate that cooperates with the torque provided by said spur gears but the spring torque alone is insufficient to return the assembly to the position to receive the laminate.

18. Apparatus for pressing a bent laminate comprising two matched curved glass sheets and a thermoplastic interlayer, said apparatus comprising a supporting structure, a first pair of spaced supporting members mounted for free vertical movement relative to the supporting structure, a freely turning balanced roll housing assembly including a second pair of spaced supporting members, a trunnion for each of said second pair of supporting members, said trunnions providing an axis of rotation for said assembly relative to the first pair of supporting members between a position to receive a laminate and a position to discharge the laminate, a pair of nipper rolls rotatably mounted to the second pair of supporting members for engagement of the rolls against opposite surfaces of the laminate and a first spur gear coaxially mounted to the lower nipper roll, a shaft rotatably mounted within and extending beyond one of said trunnions and between said second pair of spaced supporting members, a second spur gear mounted on said shaft and engaging the first spur gear, means for rotation of said shaft, said first and second spur gears providing a torque causing rotation of said assembly into the position to receive the laminate, and an adjustable stop means for limiting the turning of the assembly in the tilted laminate-receiving position, said stop means including a crank arm adjustably rigidly mounted on one of said trunnions and check means pivotally mounted at one end to one of the first pair of supporting members and at the other end to said crank arm, said check means decelerating the rotation of the assembly as it approaches the position to receive the laminate.

References Cited in the file of this patent

UNITED STATES PATENTS

| | | |
|---|---|---|
| 1,897,862 | Randall | Feb. 14, 1933 |
| 2,025,115 | Lytle | Dec. 24, 1935 |
| 2,628,177 | Boicey et al. | Feb. 10, 1953 |
| 2,673,168 | Pascoe et al. | Mar. 23, 1954 |
| 2,729,581 | Pascoe et al. | Jan. 3, 1956 |
| 2,825,671 | Langhart et al. | Mar. 4, 1958 |
| 2,849,345 | Smith et al. | Aug. 26, 1958 |